Oct. 19, 1965     J. E. SCERBO ETAL     3,212,732
SYMMETRICAL ACTUATOR
Filed May 14, 1963     3 Sheets-Sheet 1
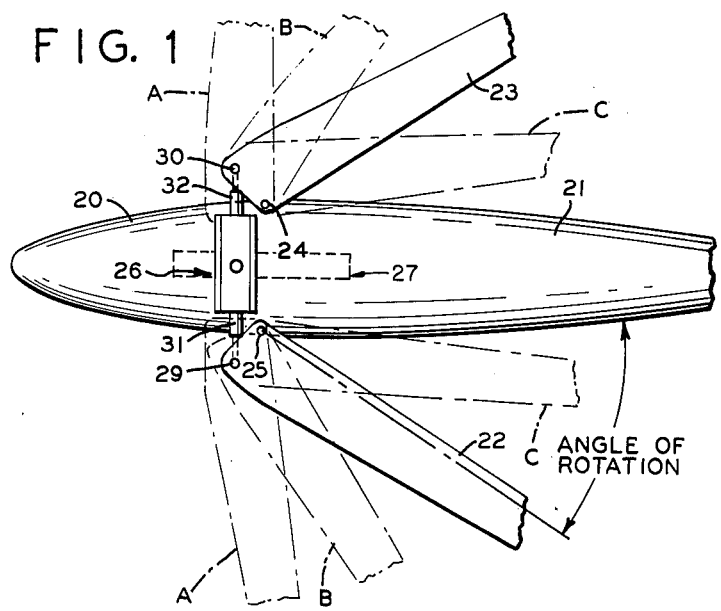
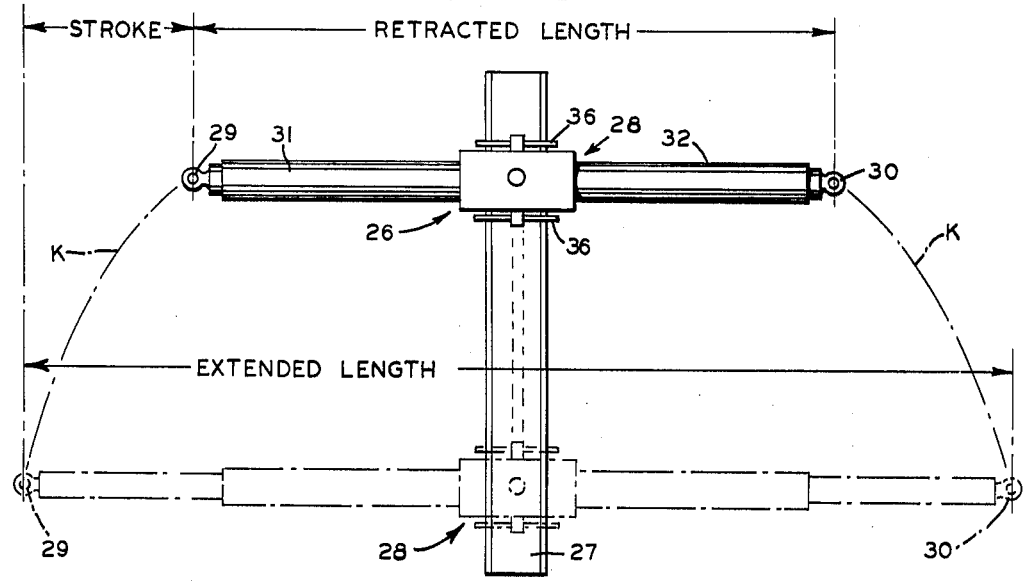
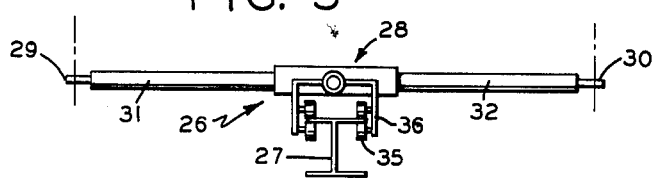
JOSEPH E. SCERBO
ARTHUR H. SHAW
INVENTORS.
BY Arthur J. Plantamura
ATTORNEY.

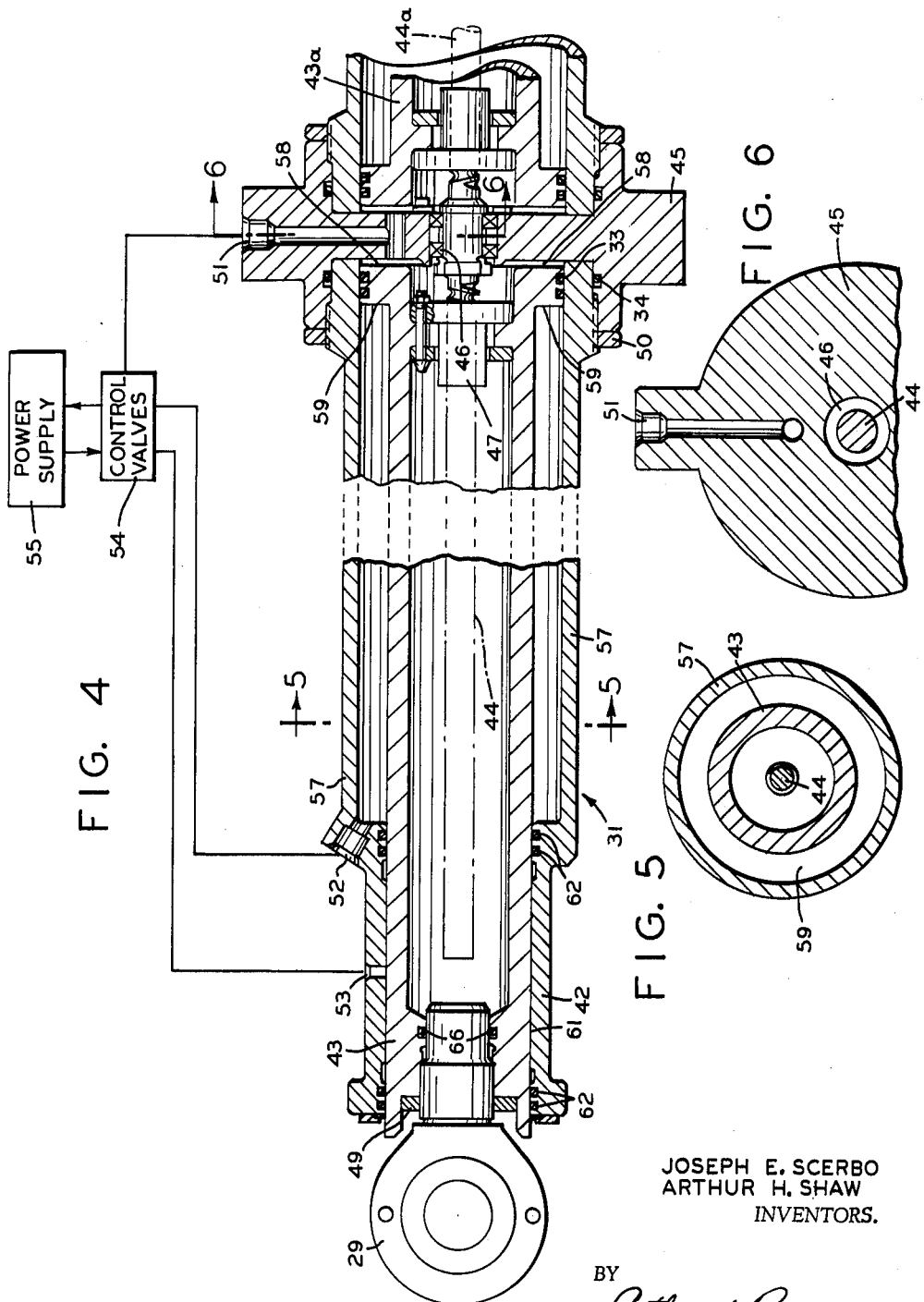

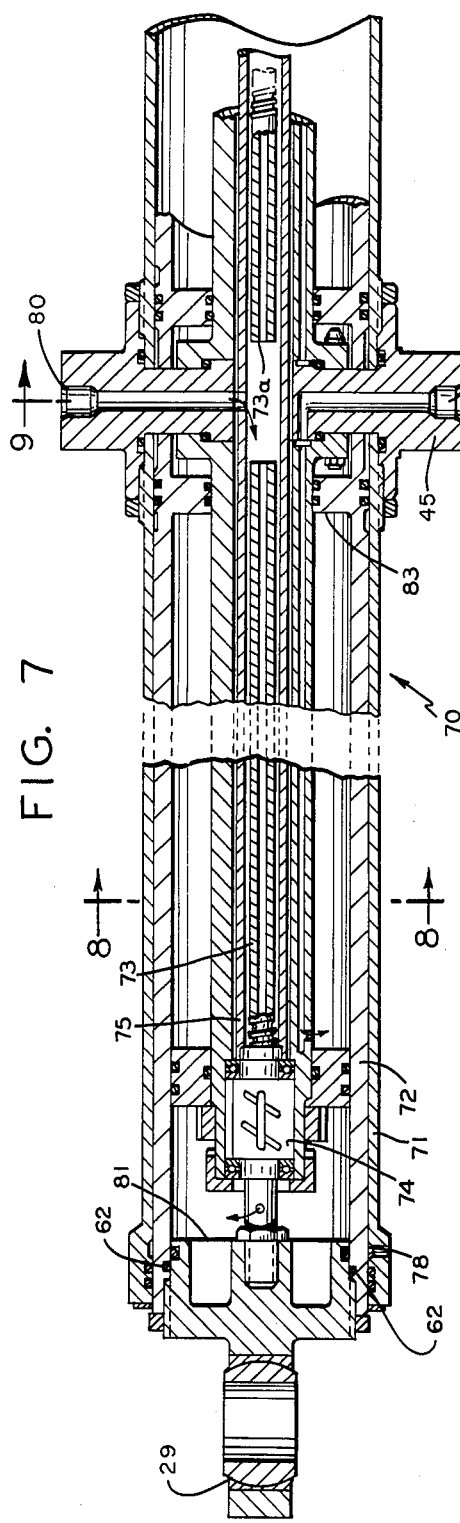
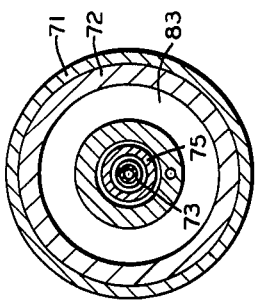
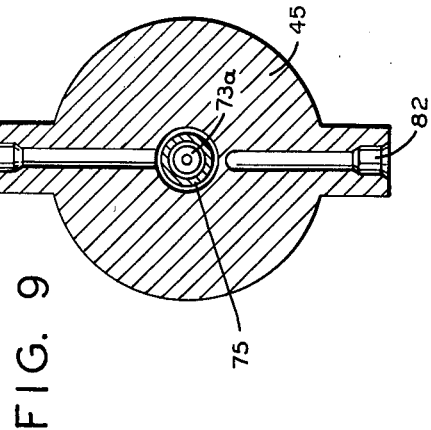

United States Patent Office 3,212,732
Patented Oct. 19, 1965

3,212,732
SYMMETRICAL ACTUATOR
Joseph E. Scerbo, Stamford, Conn., and Arthur H. Shaw, South Salem, N.Y., assignors to American Machine & Foundry Company, a corporation of New Jersey
Filed May 14, 1963, Ser. No. 280,264
8 Claims. (Cl. 244—46)

The present invention relates to actuator mechanisms and in particular to a paired actuator mechanism of the type capable of operating two extensible actuator arms in opposite directions in unison. The arms are synchronized and are moveable simultaneously an equal distance to an infinite number of positions. More specifically, the invention relates to an actuator mechanism of relative rugged structure which has fail-safe characteristics and has as an important application in the actuation of wings on sweep wing aircraft.

In aircraft of the kind equipped with pivotable wings, at lower speeds of the aircraft, i.e. in the subsonic or transonic region, the ends of the wings are disposed further from the fuselage whereas, at relative higher speeds, i.e. in the supersonic region, the wings are swept backward so that the ends of the wings are closer to the aircraft fuselage. Modern aircraft particularly the jet-propelled variety are designed so as to have relatively high speeds. As the speed increases it is important, in order to provide minimum drag, to have relatively small wing spread. However, at the minimum spread condition of the wings, the aircraft is suitable for high speed travel but unsuitable for landings and take-off when relatively low speeds are demanded. It would thus be desirable that the optimum aircraft wing for high speed aircraft is that which is capable of providing suitable lift at low speeds and minimum drag at high speeds. This may be effected through a single wing by sweeping the wing back toward the fuselage to form a small angle with the fuselage for high speeds and outwardly to form a larger angle with the fuselage for slower speeds. The present invention is thus directed to a mechanism suitable for permitting smooth, dependable, equal and synchronous movement of the angular relationship of the wings to the aircraft fuselage in an infinite number of positions. The desired angle which the wing may form with the fuselage may vary from substantially 90 degrees in the front position of the wings to substantially coincidence of the wing with the fuselage in the swept back position of the wings. The change of angular relationship of wing to fuselage will hereinafter sometimes be referred to as the "sweep of the wing" and when so expressed will be understood to mean the fore and aft angular disposition of the wings of the aircraft with respect to the fuselage.

In a mechanism having the capability of changing the sweep of aircraft wings, ruggedness, high reliability and relatively light weight are, of course, essential characteristics. It is also highly desirable that mechanism of this kind offer a wide range of angular positions in which the wing may be locked in synchronous symmetrical relationship. Furthermore, it is critical in mechanism of this kind that the apparatus comprise a fail-safe apparatus, i.e., if there is a failure of actuator power the actuator is securely and dependably locked against the very substantial forces which may be imposed on the actuator, e.g., as when connected to aircraft wings. The actuating arrangement provided by the present invention complies fully with each of these various requisites.

It is an object of the present invention to provide a dual rod actuator mechanism which offers synchronized movement in symmetry and in an infinite number of securely locked positions. It is a more particular object of the invention to provide a fail-safe actuator mechanism of this kind which is particularly adapted to actuate the sweep of aircraft wings.

Additional objects, advantages and capabilities of the invention herein disclosed will become apparent from the following detailed description taken in conjunction with the accompanying drawing wherein:

FIG. 1 is a diagram illustrating schematically the positioning of the actuator mechanism in relationship on the wings of an aircraft.

FIG. 2 is an enlarged diagram illustrating schematically a mounting track which may be positioned coaxially with the fuselage and along which the actuator may be moved.

FIG. 3 is a transverse view on a smaller scale of the mounting arrangement and actuator shown in FIG. 2.

FIG. 4 is a side elevational view partially in section of more than one-half of one embodiment of an actuator, in accordance with the invention, said actuator being substantially symmetrical.

FIG. 5 is a transverse sectional view taken substantially along line 5—5 of FIG. 4.

FIG. 6 is another transverse sectional view taken substantially along line 6—6 of FIG. 4.

FIG. 7 is a side elevational view partially in section similar to that of FIG. 4 illustrating an actuator mechanism having an alternate arrangement.

FIG. 8 is a transverse sectional view taken substantially along line 8—8 of FIG. 7.

FIG. 9 is a transverse sectional view taken substantially along line 9—9 of FIG. 7.

Referring to FIG. 1 of the drawing, an aircraft 20 comprising a conventional fuselage 21 equipped with a pair of sweep wings 22 and 23 is illustrated. Wings 22 and 23 are arranged to be pivotally moveable, i.e. rotatable in a substantial 90° arc, about pivot points 24 and 25 fixed to the fuselage. The wings 22 and 23 may be positioned in any of an indefinite number of angular relationships to the fuselage 21, three alternate positions being illustrated by broken lines designated as positions A, B and C. Angular movement of the wings is effected by extension and retraction of the rods of actuator arrangement 26 which comprises a fuselage mount 27, illustrated in FIG. 3 as an I-beam, upon which the actuator 28 is mounted substantially normal to the fuselage longitudinal axis for movement axially with respect to the fuselage longitudinal axis. The actuator rods 31 and 32 are suitably connected at 29 and 30 to the wings 22 and 23, for the purpose of pivoting the wings in varying angular relationships to the fuselage 21.

By reference to FIG. 2, the operable relationship between actuator 28 and the function of the mount 27 on which the actuator is carried may be more clearly understood. It is seen that as the wings are disposed in the position illustrated A in FIG. 1 the actuator rods, as designated by rod eye connections 29 and 30, are in the retracted position. In sweeping the wings aft so that the angle which the wings form with the fuselage is reduced, the leading edge of wing, at the point where the rod eyes 29 and 30 are attached, moves through the arc designated K in FIG. 2. In this movement, the actuator in the embodiment in which the rods 31 and 32 are substantially rigid overall, must necessarily be aft to conform to the geometry of the movement as shown by the dotted outline in FIG. 2. Mount 27 thus functions as a track upon which the actuator is carried fore and aft. It will now be generally understood that the arrangement offers the capability for the sweep and locking of the wings at any desired angle. For take-off, landing and slow speed flight, the wings are disposed forward making a large angle with the fuselage where they offer substantially maximum lift for the aircraft. As the aircraft increases in speed, and need of aerodynamic lift from the wings is reduced, the wings are pivoted aft to reduce drag on the aircraft. The actuator mechanism 28 which enables the wings to be pivoted aft will now be described in greater detail.

The mechanism essentially provides for operating two opposed actuator rods in a synchronized motion for both the extending and retracting direction. The invention will be described in connection with actuator rods which are linearly disposed, i.e. the arms are axially aligned in a linear assembly, but it will be apparent that the invention also contemplates an arrangement in which the rods are joined at an angular attitude or by a variable angle connection.

The actuator 28 is moved along the track 27 by any suitable means. As shown, the arrangement comprises generally a set of captive guide rollers 35 mounted on I-beam or track 27 by means of a trunnion bracket 36.

Particular reference to the assembly of FIG. 4 will illustrate a fractional part of the entire unit, i.e., the assembly is essentially symmetrical about the element shown as the trunnion 45. Hence only one half of the unit is shown in its entirety and described fully. For the purpose of facilitating the comprehension of the symmetrical parts on the right hand side of the center of trunnion 45 the symmetrical parts will be designated by the same reference number followed by the letter "a."

Assembly 31 comprises a barrel 57 affixed to the trunnion 45 which functions as the mounting point for the unit and comprises the center of symmetry for the actuator. Within the barrel 57 is mounted a piston and rod assembly 43 terminating in any suitable attachable structure such as the rod eye 29 to be used in connecting the actuator to any mechanism, e.g., the aircraft wing 22 of FIG. 1. A lock nut 49 may be employed to secure the rod eye 29 to rod assembly 43. A seal 66 prevents external loss of fluid from the actuator.

A locking bearing 42 comprising a fluid pressure releasable interference fit is provided in the barrel 57 to lock the barrel 57 to piston rod 43. The interlock or coupling at the bearing surface 61 is unlocked through fluid pressure introduced at port 53. To contain the fluid introduced at 53, for the purpose of expanding the interface 61, dynamic seals 62 are provided. Reference is made to the copending application of B. Frassetto et al., Serial No. 280,355, filed May 14, 1963, now Patent 3,150,571, wherein the elements and operation of a pressurized fluid interference fit bearing lock are described in greater detail. Any suitable arrangement such as lock nut 50 is provided to secure the barrel 57 to the trunnion 45. Until the bearing surface 61 is disengaged from the barrel by pressurized fluid introduced at port 53, the actuator is locked and its rods 43 and 43a are incapable of movement, i.e., the arms may not extend or retract. After the bearing 61 is unlocked by providing pressurized fluid at 53 to separate the interface between bearing members 42 and 43, movement of the actuator arms 43 and 43a is effected either by suitably mechanical means or, as illustrated, by introducing fluid under pressure at port 51 for extension, and at port 52 for retraction. Dynamic seal 33 for the piston 43 and static seal 34 maintain fluid tight integrity. When the actuator is extending, port 52 functions as a vent, whereas when the actuator is retracting, port 51 serves as the vent.

The coordination of the valving arrangement for introducing fluid pressure at the various ports in the proper time sequence is effected by adapting any appropriate valve control arrangement 54, of the kind adaptable from systems known to those skilled in the art and described for example in the hereinabove referred to patent of B. Frassetto et al. A suitable power source for the valve control system is shown at 55.

In order to produce synchronized movement of each rod 43 and 43a of the actuator in unison, a high efficiency screw, e.g., a ball screw of suitable commercially available type in which friction is minimal, is preferably utilized so that extension and retraction in any of an unlimited number of increments occurs equally and simultaneously. As shown, reverse drive ball screw and nut assembly of the type referred to in the art as "frictionless" is employed. This mechanism functions by driving the nut which in turn rotates the ball screw. Ball screw arrangements of this type, for example, are available from Saginaw Steering Gear Division of General Motors, Saginaw, Michigan, and are illustrated for example in a publication entitled "Design Guide 62–9" of this manufacturer.

In the arrangement shown in FIG. 4, the screw 44 is a unitized shaft retained laterally at 46 in thrust bearings. The screw comprises a substantially rigid integral member having a left hand screw portion designated 44 and a right hand screw portion 44a. It will be apparent that the left and right hand parts of the screw 44 and 44a respectively, may be separate and operated in synchronization at a center junction and, for this purpose, may employ additional gearing of a conventional configuration such as a suitable bevel gear assembly. The screw 44 is retained at the trunnion 45 by thrust bearings 46. A ball screw nut 47 is suitably affixed to the actuator piston 43 as well as to the ball screw 44.

The operation of the mechanism will now be described. By reference to the elements of the actuator and screw it is seen that for every incremental movement of the actuator piston or rod 43, the ball screw 44 must of necessity rotate a proportional increment. As this occurs, because the ball screw 44 is a unitized element with 44a, both pistons or rods 43 and 43a which are interconnected to the screw will move in unison; that is, under the control effected by the movement of the screw with which the piston rods 43 and 43a are engaged.

In the at rest condition, that is, when no fluid pressure is applied through the bearing lock release port 53, the interference fit between members 42 and 43 securely interlocks members 42 and 43. The amount of force locking the surface of these members is substantial in any case, but it may be varied and it is generally dependent on the extent of the interference in the fit. In order to unlock this bearing lock which in effect is a coupling between members 42 and 43, fluid under pressure is introduced at the bearing interface 61 between the members 42 and 43. Sufficient pressure is employed to offset the force of the interference fit. The introduction of pressurized fluid, e.g. hydraulic liquid, at this interface allows the piston-rod 43 to be moved. The movement of the rod 43 may be effected by any suitable means. As shown and in the preferred embodiment the system comprises a control valve arrangement wherein the force enabling translation of the arm 43 is coordinated with the release of pressure introduced at 53 through suitable control valve. Hence, after the bearing interface has been uncoupled by introducing fluid pressure at 53, pressure is thereupon delivered through the port 51 when it is desired to extend the rod 43. In this movement, port 52 is utilized as a vent; conversely, when it is desired to retract the rod 43 into the barrel 57, the fluid pressure is introduced at 52 during or after uncoupling the bearing by delivering fluid pressure at port 53. In this latter operation, port 51 is utilized as a vent. The force of fluid pressure introduced at 51 impinges on the surface 58 of the piston 43 and for the retraction movement fluid pressure introduced or delivered through port 52 impinges on the surface 59. At any stage of retraction or extension of the rod 43 in the barrel 57, pressure at 53 may be relieved so that the members 43 and 57 are interlocked at any relative position of stroke.

The embodiment of FIG. 7 differs from that shown and described in FIG. 4 in that it is provided with an interference fit locking bearing for the full length of the interface between the barrel member and piston or rod member. Additionally, in the modification of FIG. 7, the ball screw nut in each side are separate rotatable elements which are connected to each other through a torque tube. Referring to FIG. 7, the assembly 70 includes the locking bearing and barrel 71. Contained in the barrel is the piston-rod 72. In this embodiment, the ball screws 73 and 73a within each rod are movable longitudinally, and the nut 74 and 74a is fixed longitudinally but is rotatable. Since the two separate ball screws 73 and 73a are similar, as the piston or rod 72 strokes, the ball screw nut of necessity must rotate. This rotation is equal on both nuts 74 and 74a through the connection of the torque tube 75. Similar elements in FIG. 7 are numbered as in FIG. 4.

Operation of the embodiment of FIG. 7 is as follows:

In the at rest or unpressurized condition, the members 71 and 72 are locked by virtue of the interference fit. At the interface between these members, as noted hereinabove in the description of the embodiment of FIG. 4, the quantum of force locking members 71 and 72 is dependent on the extent of the interference designed into these elements. In view of the larger interface bearing area between members 71 and 72 in FIG. 7 over that of the bearing surface area of FIG. 4, it may be suitable to use an interference fit of smaller degree. To uncouple the bearing lock between the barrel 71 and rod 72, fluid under pressure is delivered at 78; the effect is to separate the interface and permit rod 72 to be translated with respect to the barrel 71, the pressurized fluid being controlled through suitable control valves. When this bearing is unlocked fluid under pressure is introduced at 80 and impinges on the face 81 of member 72, forcing the extension of rod 72 from the barrel 71. The degree of extension of member 72 may be accurately controlled and held at an infinite number of positions and locked thereat by relief of pressure at 78.

In the reverse motion, to effect retraction after the fluid under pressure is introduced at 78 to uncouple the bearing lock between barrel 71 and rod 72, pressure for the retract motion is introduced at inlet 82 and is ported so as to impinge on surface 83 of the rod 72. When the members are in the desired relative position the fluid pressure at 78 is relieved, securely retaining the rod 72 in barrel 71. It will be apparent that at any stage, if there is a failure of pressure at 78, the effect is to lock the rod 72 in the barrel 71.

In addition to translatory movement, the rods may extend and retract accompanied also by a turning movement of rod 43 with respect to barrel 42 in FIG. 4 and rod 72 with respect to barrel 71 in FIG. 7.

Various additional modifications may be made in the teaching presented without departing from the scope of the invention. Accordingly, the invention is not to be limited to details except insofar as necessitated by the appended claims.

What is claimed is:

1. An actuator mechanism comprising in combination a substantially cylindrical barrel, a pair of actuator rods arranged concentrically and in substantial symmetry within said barrel, each rod being disposed with respect to the other rod, for equal but opposite translatory movement relative to said barrel, an interlock-bearing segment between at least part of the coextensive portion of said barrel and said rods formed by an interference fit of said barrel and said rods, means for introducing fluid under pressure to the interface of said interference fit, and means for effecting translation of said rods in synchronized movement of equal and opposite increments to desired operating positions when said interference fit is unlocked by pressurization, said interference fit being restored upon release of said pressurization, whereby to lock said rods in said positions.

2. The actuator mechanism of claim 1 wherein the means for effecting translation of said rods when the interference fit is unlocked, comprises a hydraulic system.

3. The actuator mechanism of claim 1 wherein the means for effecting equal and opposite incremental movement includes a frictionless ball screw which interconnects both said rods and limits movement in one rod to a corresponding equal movement in the opposed rod.

4. In combination with an aircraft having sweep wings capable of being pivoted fore and aft with respect to the fuselage of said aircraft, an actuator attached to the fuselage of said aircraft and to said wings for the purpose of pivoting and interlocking said wings in an infinite number of angular positions with respect to said fuselage, said actuator comprising a substantially cylindrical barrel, a pair of actuator rods arranged concentrically and in substantial symmetry within said barrel, each rod being disposed with respect to the other rod, for equal but opposite translatory movement relative to said barrel, a bearing-lock segment between at least part of the coextensive portion of said barrel and said rods formed by an interference fit of said barrel and said rods, means for introducing fluid under pressure to the interface of said interference fit, and means for effecting translation of said rods in synchronized movement of equal and opposite increments when said interference fit is unlocked by pressurization to locate said wings in selected positions relative to said fuselage, and said rods being locked against movement upon release of said pressurization, whereby said wings are maintained positively in said positions.

5. The actuator mechanism of claim 4 wherein the means for effecting translation of said rods when the interference fit is separated, comprises a hydraulic system wherein said rods include a piston and said barrel a cylinder for said hydraulic system.

6. The actuator mechanism of claim 4 wherein the means for effecting equal and opposite incremental movement includes a frictionless ball screw which interconnects both said rods and limits movement in one rod to a corresponding equal movement in the opposed rod.

7. The invention defined in claim 4 including a support for said actuator, and means movably mounting said support on said fuselage for movement longitudinally relative to said fuselage in response to the extending or retracting of said actuator rods.

8. The invention defined in claim 4, including a support carriage, means mounting said actuator on said carriage, and means on said fuselage supporting said carriage for movement longitudinally relative to said fuselage in response to the retraction or extension of said rods and the movement thereby of said wings to and from selected operating positions relative to said fuselage.

References Cited by the Examiner
UNITED STATES PATENTS

| | | | |
|---|---|---|---|
| 2,511,265 | 6/50 | Hoopingarner et al. | 244—46 |
| 2,660,029 | 11/53 | Geyer | 244—85 X |
| 2,822,995 | 2/58 | Bowen | 244—46 X |
| 2,990,141 | 6/61 | Wallis | 244—46 |

FERGUS S. MIDDLETON, *Primary Examiner.*